US011396284B2

(12) United States Patent
Cecil et al.

(10) Patent No.: US 11,396,284 B2
(45) Date of Patent: Jul. 26, 2022

(54) SYSTEMS AND METHODS FOR ENGINE BRAKE DIAGNOSTICS AND CONTROL

(71) Applicant: Cummins Inc., Columbus, IN (US)

(72) Inventors: Adam C. Cecil, Columbus, IN (US); Adrian P. Dale, Columbus, IN (US); Anshul Shambav, Glenview, IL (US); Anthony K. Perfetto, Columbus, IN (US); David J. Stroh, Columbus, IN (US); J. Steven Kolhouse, Columbus, IN (US); Ryan E. Schultz, Columbus, IN (US); Samuel C. Geckler, Columbus, IN (US); Thomas M. Yonushonis, Columbus, IN (US)

(73) Assignee: Cummins Inc., Columbus, IN (US)

(*) Notice: Subject to any disclaimer, the term of this patent is extended or adjusted under 35 U.S.C. 154(b) by 242 days.

(21) Appl. No.: 16/689,824

(22) Filed: Nov. 20, 2019

(65) Prior Publication Data
US 2020/0156613 A1    May 21, 2020

Related U.S. Application Data

(60) Provisional application No. 62/770,425, filed on Nov. 21, 2018.

(51) Int. Cl.
*B60T 17/22*     (2006.01)
*B60T 8/17*      (2006.01)
*F01N 13/10*     (2010.01)
*B60W 30/18*     (2012.01)

(52) U.S. Cl.
CPC ............ *B60T 17/22* (2013.01); *B60T 8/1701* (2013.01); *B60W 30/18136* (2013.01); *F01N 13/10* (2013.01); *B60T 2270/406* (2013.01)

(58) Field of Classification Search
CPC .......... B60T 17/22; B60T 8/17; B60W 30/18; F01N 13/10
USPC ........................................................ 701/70
See application file for complete search history.

(56) References Cited

U.S. PATENT DOCUMENTS

| 6,892,569 | B2  | 5/2005  | Martin et al. |
| 8,543,288 | B2  | 9/2013  | Bligard et al. |
| 2002/0174849 | A1 | 11/2002 | Ruggiero et al. |
| 2005/0205059 | A1* | 9/2005 | Lewis ..................... F02D 37/02 123/432 |

(Continued)

FOREIGN PATENT DOCUMENTS

| DE | 102017112670 A1 * | 12/2017 | ............ B60W 10/06 |
| WO | WO-2010006311 A1 * | 1/2010 | ......... F02D 41/0087 |
| WO | WO-2013/159788 | 1/2013 | |

*Primary Examiner* — Atul Trivedi
(74) *Attorney, Agent, or Firm* — Foley & Lardner LLP (57) ABSTRACT

A system for diagnosing engine braking performance of an engine comprising a plurality of cylinders comprises an exhaust manifold pressure sensor configured to detect an exhaust manifold pressure corresponding to exhaust gas emitted from a plurality of cylinders. A controller is configured to determine an exhaust manifold pressure value corresponding to at least one cylinder of the plurality of cylinders that is being used for engine braking, from an exhaust manifold pressure sensor signal received from the exhaust manifold pressure sensor. The controller is also configured to determine an engine braking value based on the exhaust manifold pressure value.

18 Claims, 5 Drawing Sheets

(56) References Cited

U.S. PATENT DOCUMENTS

| | | | | |
|---|---|---|---|---|
| 2008/0041336 | A1* | 2/2008 | Gibson | F02D 41/123 123/322 |
| 2010/0006065 | A1* | 1/2010 | Tripathi | F02P 5/1512 123/481 |
| 2010/0258080 | A1* | 10/2010 | Andrasko | F02B 37/24 60/602 |
| 2011/0208405 | A1* | 8/2011 | Tripathi | F02D 41/1402 701/102 |
| 2011/0213540 | A1* | 9/2011 | Tripathi | F02D 17/02 701/102 |
| 2011/0290214 | A1* | 12/2011 | Ma | F02N 11/0814 123/406.23 |
| 2012/0101700 | A1* | 4/2012 | Mitchell | B60W 30/18136 701/58 |
| 2014/0034010 | A1* | 2/2014 | Serrano | F02D 41/0087 123/324 |
| 2015/0369180 | A1* | 12/2015 | Leone | F02D 13/06 123/52.1 |
| 2017/0355374 | A1* | 12/2017 | Glugla | B60W 10/11 |
| 2017/0356355 | A1* | 12/2017 | Rollinger | F02B 37/16 |
| 2017/0356358 | A1* | 12/2017 | Richards | F02D 41/26 |
| 2017/0356364 | A1* | 12/2017 | Glugla | F02D 41/3094 |
| 2017/0356365 | A1* | 12/2017 | Glugla | F02P 5/1523 |
| 2017/0356366 | A1* | 12/2017 | Glugla | F02P 5/045 |
| 2017/0356367 | A1* | 12/2017 | Glugla | F02P 5/145 |
| 2017/0356368 | A1* | 12/2017 | Richards | F02D 41/123 |
| 2017/0356369 | A1* | 12/2017 | Doering | F02D 41/26 |
| 2017/0356370 | A1* | 12/2017 | Doering | F02D 13/0215 |
| 2017/0356371 | A1* | 12/2017 | Rollinger | F01L 13/0005 |
| 2017/0356372 | A1* | 12/2017 | Richards | F02B 37/12 |
| 2017/0356374 | A1* | 12/2017 | Rollinger | F02D 41/0007 |
| 2017/0356375 | A1* | 12/2017 | Glugla | B60W 30/1882 |
| 2017/0356381 | A1* | 12/2017 | Richards | F02D 41/3094 |
| 2018/0051598 | A1* | 2/2018 | Pedro | F01L 1/344 |
| 2018/0230927 | A1* | 8/2018 | Hayden | F02D 41/0002 |
| 2018/0340476 | A1* | 11/2018 | Hanshaw | F01L 1/3442 |
| 2019/0085758 | A1* | 3/2019 | Kurtz | F02D 41/005 |
| 2019/0085759 | A1* | 3/2019 | Kurtz | F02D 41/0005 |
| 2019/0178193 | A1* | 6/2019 | Glugla | F02D 41/1448 |
| 2020/0018244 | A1* | 1/2020 | Kolhouse | F02D 41/0005 |
| 2020/0102896 | A1* | 4/2020 | Shipp | F01L 1/344 |
| 2020/0156643 | A1* | 5/2020 | Hu | F02D 41/0007 |
| 2021/0301690 | A1* | 9/2021 | Martz | F02B 37/24 |

* cited by examiner

SYSTEMS AND METHODS FOR ENGINE BRAKE DIAGNOSTICS AND CONTROL

CROSS-REFERENCE TO RELATED APPLICATION

The present application claims priority to and the benefit of U.S. Provisional Application No. 62/770,425, filed Nov. 21, 2018, which is incorporated herein by reference in its entirety.

TECHNICAL FIELD

The present disclosure relates generally to the field of engine control and more particularly, to diagnosis and control of engine braking in internal combustion engines.

BACKGROUND

Engine braking is used in spark ignition (SI) or compression ignition (CI) engines to supplement traditional braking. Compression release braking (also known as Jake braking) is a common feature in CI engines. Compression release braking includes using a cam shaft lobe or rocker arm to open an exhaust valve of an engine cylinder when a piston of the cylinder is near a top dead center (TDC) of the compression stroke of the cylinder. This releases at least a portion of the compressed air trapped in the cylinders into the exhaust manifold, i.e., the exhaust gas released from the cylinder used for engine braking merely includes compressed air. This reduces volumetric efficiency and subsequent torque absorption (i.e., negative torque) that can help slow the vehicle.

Another form of engine braking is vacuum braking commonly used in SI engines. This occurs when a throttle of the engine is released. For example, when a throttle pedal of the vehicle is actuated, a butterfly valve disposed at an engine intake opens allowing air to be mixed with fuel for combustion. When the throttle is released, the butterfly valve closes allowing only a very small amount of air to enter the engine. This creates a vacuum within the intake manifold, which produces an opposing force to the reciprocating pistons of the engine. The effort that has to be exerted by the pistons to oppose the manifold vacuum saps their reciprocating energy causing the pistons to slow. The slowing pistons slow rotation of the crankshaft, therefore reducing road speed.

Engine braking may also be achieved via a transmission. For example, downshifting a transmission by moving to a lower gear increases the torque on the engine causing increased engine braking and vice versa. The increase in speed of the engine due to downshifting also increase engine cycles (i.e., a spark ignition or compression ignition full cycle). This leads to an increase in the pumping of lubricant and fuel, which also lead to an increase in parasitic losses contributing to engine braking. Furthermore, a small amount of engine braking is also achieved due to friction between moving parts of the engine. Although lubrication is provided, a small amount of friction still exists between moving parts of the engine as they interact. This friction has a negative influence on positive energy of the moving engine, thus stripping rotational energy from the crankshaft and braking the engine. While engine braking can help avoid dangerous driving conditions, and reduce wear of the vehicles service brakes, conventional vehicles lack active mechanisms to diagnose and control engine braking.

SUMMARY

Embodiments described herein relate generally to systems and methods for diagnosing and maintaining engine braking performance in engines. In particular, embodiments described herein relate to systems and methods for diagnosing compression release engine braking using an exhaust manifold pressure (EMP) sensor, and maintaining engine braking performance based on EMP, vehicle speed, vehicle deceleration rate and/or brake pedal position.

In some embodiments, a system for diagnosing and controlling engine braking performance of an engine comprising a plurality of cylinders comprises an EMP sensor configured to detect an EMP corresponding to exhaust gas emitted from a plurality of cylinders. A controller is configured to determine an EMP value corresponding to at least one cylinder of the plurality of cylinders that is being used for engine braking, from an EMP sensor signal received from the EMP sensor. The controller is also configured to determine an engine braking value based on the exhaust manifold pressure value.

In some embodiments, a system comprises a controller configured to set a target engine braking value for engine braking performance based on a target EMP of exhaust gas emitted by at least one cylinder of a plurality of cylinders that is being used for engine braking. The controller is also configured to adjust a component associated with the engine to maintain the engine braking performance at the target engine braking value.

In some embodiments, a method for controlling engine braking in an engine including a plurality of cylinders, comprises determining an exhaust manifold pressure value corresponding to at least one cylinder of the plurality of cylinders that is being used for engine braking; and determining an engine braking value based on the exhaust manifold pressure value.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF FIGURES

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for diagnosing and maintaining engine braking performance in engines. In particular, embodiments described herein relate to systems and methods for diagnosing compression release engine braking using an exhaust manifold pressure (EMP) sensor, and maintaining engine braking performance based on EMP, vehicle speed, vehicle deceleration rate and/or brake pedal position.

As described and used herein the term "engine braking" refers to compression release braking, vacuum breaking and/or transmission braking, unless specified otherwise.

Various embodiments of the systems and methods described herein for diagnosing, setting and maintaining engine braking provide benefits including, for example: (1) allowing accurate diagnosis of engine braking performance on a periodic basis using an EMP sensor; (2) preventing under-braking or over-braking of the engine; (3) providing compression release braking in SI engines, thereby allowing a combination of compression release and vacuum braking to be used for providing more efficient braking; (4) allowing setting and maintaining of an engine braking performance using various feedback sources, therefore providing more efficient control over engine braking performance; and (5) reducing usage of and load exerted on conventional brakes, thereby reducing wear and extending life of the conventional brakes and reducing maintenance costs.

Figure 1:
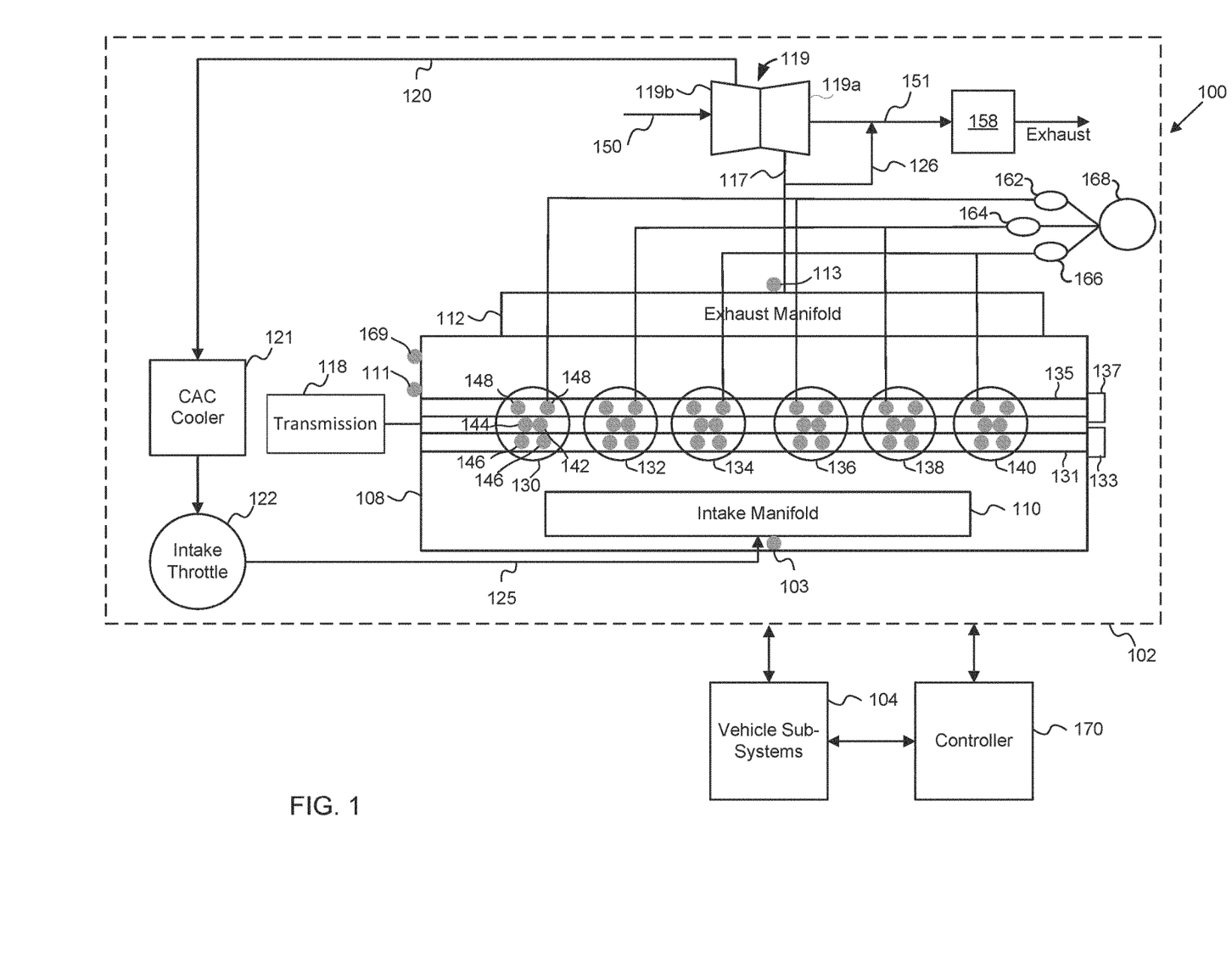
FIG. 1 is a schematic illustration of a system including a controller, according to an embodiment.

FIG. 1 is a schematic illustration of a system 100 including a controller 170, according to an embodiment. The system 100 may be included in a vehicle, which may be an on-road (e.g., car, SUV, line haul truck, etc.) or off-road (e.g., a marine vehicle, a mining vehicle, etc.) vehicle. The system 100 includes a vehicle system 102 and vehicle sub-systems 104. The vehicle system 102 includes an engine 108. In some embodiments, the engine 108 may be a SI engine (e.g., a gasoline engine, an ethanol engine, an E-85 engine or any other suitable spark ignition engine). In other embodiments, the engine 108 may be a CI engine. The vehicle system 102 also includes an intake manifold 110, an exhaust manifold 112, a turbocharger 119, a charge air cooler (CAC) 121, an intake throttle 122, a pump 168 and valve solenoids 162, 164 and 166, an intake cam phaser 133, an exhaust cam phaser 137 and a transmission 118. The vehicle system 102 may also include an aftertreatment system 158.

The engine 108 includes a plurality of cylinders 130, 132, 134, 136, 138 and 140 configured to receive exhaust gas from the intake throttle 122 via the intake manifold 110 and compress the air (e.g., via a reciprocating piston) to a suitable compression ratio for optimal combustion. It should be appreciated that while FIG. 1 shows a particular embodiment of an engine 108 including six cylinders, any other engine including any number of cylinders, for example 4, 8, 10, 12 or even more may be included in the vehicle system 102.

In some embodiments, each of the plurality of cylinders 130, 132, 134, 136, 138 and 140 are configured to have a compression ratio that is higher than a compression ratio used in conventional SI engines. For example, each of the plurality of cylinders 130, 132, 134, 136, 138 and 140 may have a compression ratio similar to a compression ratio used in CI engines (e.g., a compression ratio between 15-20). The higher compression ratio allows compression release engine braking to be performed in one or more of the plurality of cylinders 130, 132, 134, 136, 138 and 140. In other embodiments, the plurality of cylinders 130, 132, 134, 136, 138 and 140 may have a compression similar to those of conventional SI engines (e.g., a compression ratio of 10-14).

A fuel injector 142 and a spark plug 144 are coupled to each of the cylinders 130, 132, 134, 136, 138 and 140. In some embodiments, the engine 108 may include a CI engine. In such embodiments, the spark plugs 144 are excluded. A pair of intake valves 146 and exhaust valves 148 are coupled to each of the plurality of cylinders 130, 132, 134, 136, 138 and 140 (e.g., disposed in a cylinder head of the engine 108). In other embodiments, each of the plurality of cylinders 130, 132, 134, 136, 138 and 140 may include a single intake valve and a single exhaust valve.

The intake cam phaser 133 (e.g., a computer controlled cam gear) is operatively coupled to the intake valves 146 of each of the cylinders 130, 132, 134, 136, 138 and 140 via an intake cam shaft 131 and configured to control an intake valve timing (e.g., an open and close timing) of the intake valves 146. Moreover, an exhaust cam phaser 137 is operatively coupled to the exhaust valves 148 of each of the cylinders 130, 132, 134, 136, 138 and 140 via an exhaust camshaft 135 and configured to control an exhaust valve timing of the exhaust valves 148.

The valve solenoid 162 is coupled to at least one exhaust valve 148 of each of the cylinders 130 and 132, the valve solenoid 164 is coupled to at least one exhaust valve 148 of each of the cylinders 134 and 136, and the valve solenoid 166 is coupled to at least one exhaust valve 148 of each of the cylinders 138 and 140. The pump 168 (e.g., an oil pump) is coupled to each of the valve solenoids 162, 164, 166 and configured to selectively activate one or more of the valve solenoids 162, 164, 166. The activating of the valve solenoids 162, 164 or 166 causes the corresponding exhaust valve 148 to open and may be used to control an amount of time the corresponding exhaust valve 148 is open. For example, one or more of the valve solenoids 162, 164 or 166 may be activated when a piston of a corresponding cylinder 130, 132, 134, 136, 138 or 140 is at a TDC during a compression stroke thereof, causing the corresponding exhaust valve to open resulting in compression release braking in one or more corresponding cylinders. For example, activation of the valve solenoid 162 during the compression stroke of the cylinders 130 and 132 causes compression release braking therein. Similarly, valve solenoids 164 and 166 can be used to cause compression release braking in cylinder 134, 136 and 138, 140, respectively. While FIG. 1 shows the system 100 as including three valve solenoids 162, 164, 166, in other embodiments, the system 100 may include less than three valve solenoids (e.g., 1 or 2). For example, the system 100 may include a single valve solenoid operatively coupled to one, two or more of the plurality of cylinders 130, 132, 134, 136, 138, 140, and configured to selectively cause engine braking in the corresponding cylinder/s.

The intake manifold 110 is coupled to the engine 108 and the intake throttle 122 to receive intake air from the intake throttle 122 via an intake line 125. The intake manifold 110 communicates intake air to each of the plurality of cylinders 130, 132, 134, 136, 138, and 140. An intake pressure sensor 103 may be coupled to the intake manifold 110 and configured to determine a pressure of the intake air.

The exhaust manifold 112 is coupled to an exhaust of each of the cylinders 130, 132, 134, 136, 138, and 140 and configured to receive exhaust gas therefrom. The exhaust manifold 112 may receive exhaust gas from each of the plurality of cylinders 130, 132, 134, 136, 138, and 140 when an exhaust stroke occurs in one or more of the plurality of cylinders 130, 132, 134, 136, 138, and 140. However, during compression release braking, an exhaust valve 148 of one or more of the plurality of cylinders 130, 132, 134, 136, 138, 140 is opened during the compression stroke with the fuel injector 142 and the spark plug 144 being deactivated such that compressed air is released into the exhaust manifold 112, as previously described herein. In other embodiments, the spark plug 144 may be activated during at least a portion of the compression stroke when engine braking is utilized. Since, the charge in such instances only includes compressed air without any fuel, activation of the spark plug 144 will not cause combustion to occur in the corresponding cylinder 130, 132, 134, 136, 138 or 140 that is being utilized for engine braking.

An exhaust manifold pressure (EMP) sensor 113 is coupled to the exhaust manifold 112 and configured to measure, determine, or otherwise acquire data indicative of an EMP of the exhaust gas or compressed air expelled by each of the plurality of cylinders 130, 132, 134, 136, 138, and 140 into the exhaust manifold 112. The EMP sensor 113 may have a sensing frequency in the millisecond to microsecond range. This allows the EMP sensor 113 to detect and distinguish between EMP pulses corresponding to exhaust gas or compressed air emitted from each of the plurality of cylinders 130, 132, 134, 136, 138, and 140. When one or more of the cylinders 130, 132, 134, 136, 138, 140 is used for engine braking, the EMP of the compressed air emitted into the exhaust manifold 112 by the corresponding one of the cylinders 130, 132, 134, 136, 138, and 140 is indicative of the braking horsepower achieved via engine braking. Therefore, the EMP measured by the EMP sensor 113 can be correlated to the engine braking horsepower and used as a proxy or indicator of engine braking. For example, a target braking horsepower value may correspond to a target EMP value. If the measured EMP value is less than or greater the target EMP value, this implies that the corresponding cylinder is under braking or over braking, respectively.

Although a specific number and type of sensors are shown in FIG. 1 coupled with particular components of the system 100, it will be appreciated that the number, type, and location of the sensors included in the system 100 can vary. In some embodiments, the sensors can comprise virtual sensors (e.g. virtual torque sensors, virtual nitric oxide (NOx) sensors, etc.) structured to monitor operating parameters of the system 100.

A transmission 118 is coupled to the engine 108, for example, via a crankshaft (not shown) included in the engine 108. The transmission 118 may include an automatic transmission configured to upshift or downshift based on a load on a vehicle including the system 100, for example, to adjust a torque generated by the engine 108, a speed of the vehicle or to increase or decrease engine braking performance.

A turbocharger 119 is positioned downstream of the exhaust manifold 112 and is configured to receive exhaust gas therefrom via the exhaust line 117. The turbocharger 119 comprises a turbine 119a and a compressor 119b. The exhaust gas drives the turbine 119a, and is then communicated into a downstream component, for example, the aftertreatment system 158 via the exhaust outlet 151, the aftertreatment system 158 being configured to decompose constituents of the exhaust gas (e.g., CO, unburnt hydrocarbons, etc.) and remove particulate matter. The compressor 119b is coupled to the turbine 119a (e.g., mounted on the same shaft) and configured to be driven by the turbine 119a. The compressor 119b receives charge or intake air via an air inlet line 150 and compresses the intake air so as to pressurize the intake air. The pressurized intake air is communicated via the turbocharger line 120 to the intake throttle 122 via the CAC cooler 121, which is configured to cool the intake air before it is communicated to the engine 108. The waste gate 126 is configured to divert a portion of the exhaust gas flow greater than a threshold exhaust gas flow from the exhaust line 117 to the exhaust outlet 151 so as to bypass the turbocharger 119. This allows the waste gate 126 to regulate an amount of exhaust gas provided to the turbocharger 119 so as to control a rotational speed of the turbine 119a. In this manner, a rotational speed of the compressor 119b may be controlled, which allows control of a pressure of the intake air. In some embodiments, the waste gate 126 may also be used to adjust engine braking. For example, to increase engine braking, the waste gate 126 may be adjusted to direct more of the exhaust gas to bypass the turbocharger 119 and flow towards the aftertreatment system 158 instead of the turbocharger 119 so as to reduce the amount of compresses intake air being supplied to the engine 108 via the compressor 119b. Conversely, the waste gate 126 may reduce engine braking by directing more of the exhaust gas to the turbocharger 119 relative to the aftertreatment system 158.

While not shown, in some embodiment, the vehicle system 102 may also be configured to include an exhaust gas recirculation (EGR) system. In some embodiments, one or more of the cylinders 130, 132, 134, 136, 138, and 140 may include a dedicated EGR cylinder. In other embodiments, the EGR system may include a high pressure or low pressure EGR system.

The vehicle subsystems 104 includes various systems or subsystems configured to receive or transmit information to one of more components of the system 100 and or components associated with the engine 108, for example, to facilitate control of operation thereof. In various embodiments, the vehicle subsystems 104 may include, for example, a spark ignition system configured to provide ignition signals to each of the spark plugs 144 based on a predetermined spark timing determined by the controller 170. In some embodiments, the vehicle subsystems 104 may include a fuel injection system configured to control an amount of fuel inserted into the cylinders 130, 132, 134, 136, 138, 140 based on an insertion command provided by the controller 170.

In some embodiments, the vehicle subsystems 104 may also include an intake throttle control system configured to adjust a degree of opening of the intake throttle 122 based on commands from the controller 170, for example, to control an amount of air inserted into the plurality of cylinders 130, 132, 134, 136, 138, 140 and control engine braking. For example, the intake throttle control system may be configured to selectively close the intake throttle 122 to cause vacuum braking in one or more of the cylinders 130, 132, 134, 136, 138, 140.

In some embodiments, the vehicle subsystems 104 may include an intake cam phaser system configured to adjust the intake cam phaser 133 so as to control a timing (i.e., an open or close time) of the intake valves 146. In some embodiments, the vehicle subsystems 104 may also include an exhaust cam phaser system configured to adjust the exhaust cam phaser 137 so as to control a timing of the exhaust valves 148.

In some embodiments, the vehicle subsystems 104 may include a valve solenoid system configured to adjust an activation time and period of activation of the one or more of the valve solenoids 162, 164 and 166, for example, to cause compression release braking in one or more of the corresponding cylinders 130, 132, 134, 136, 138 and 140. For example, the valve solenoid system may be configured to activate the valve solenoid 162, 164 or 166, thereby opening the corresponding exhaust valve 148 at the TDC stage of a compression stroke of the corresponding cylinder 130, 132, 134, 136, 138 or 140, with no fuel being inserted into the corresponding cylinder 130, 132, 134, 136, 138 or 140 and the spark plug 144 being inactive. This causes compression release braking in the corresponding cylinder 130, 132, 134, 136, 138 or 140.

Thus, the valve solenoid system may be configured to control how many of the plurality of cylinders 130, 132, 134, 136, 138 or 140 are being used for compression release braking, and in some embodiments, an amount and/or duration of engine braking. For example, activating the valve solenoid 162 during TDC of the compression phase corresponds to compression release braking in the cylinders 130 and 132, activating valve solenoid 164 corresponds to compression release braking in the cylinders 134 and 136, and activating valve solenoid 166 corresponds to compression release braking in the cyliders 138 and 140. The valve solenoid system may control that opening time of the valve solenoid 162, 164 and 166 (e.g., earlier or later) which changes the EMP of the compressed air flowing into the exhaust manifold 112, thereby adjusting engine braking horsepower. For example, delaying opening of the corresponding exhaust valve 148 during engine braking may increase the EMP and, therefore increase a magnitude (i.e., horsepower) of compression release braking. Conversely, opening the exhaust valve 148 early during the compression stroke may reduce the EMP, and therefore reduce the magnitude of compression release braking. It should be understood that in some embodiments, the system 100 may include fewer than three valve solenoids that may be only coupled to a portion of the plurality of cylinders 130, 132, 134, 136, 138, 140. In such embodiments, the valve solenoids may be configured to selectively cause engine braking in only the corresponding cylinders.

Furthermore, the valve solenoid system may also be configured to control the activation time of the corresponding valve solenoid, thereby controlling a duration of the opening of the corresponding valve solenoid 162, 164 or 166, therefore controlling a duration of engine braking. For example, a time duration for which the valve solenoid 162, 164 or 166 is active controls the time duration for which the corresponding exhaust valve 148 is open at TDC of the compression stroke and, therefore the duration of compression release braking.

In some embodiments, the vehicle subsystems 104 also includes a transmission system configured to control upshifting or downshifting of the transmission 118. For example, the transmission system may be configured to downshift (i.e., change to a lower gear or setting) to increase engine braking performance, or upshift (i.e., move to higher gear) to decrease engine braking performance.

The system 100 may also include a vehicle speed sensor 169 configured to measure a vehicle speed and an acceleration or deceleration rate of the vehicle including the system 100. Furthermore, the system 100 may also include a brake pedal position sensor 111 configured to measure a position of a brake pedal associated with a conventional resistance brake of the vehicle.

Components of the system 100 may communicate with each other or external components using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the vehicle subsystems 104 and components in the system 100 of FIG. 1, the controller 170 is structured to receive data regarding one or more of the components shown in FIG. 1. For example, the data may include operation data corresponding to the EMP, vehicle speed, vehicle deceleration rate, brake pedal position and transmission status. The controller 170 may use the information to control operation of the intake throttle 122, the intake cam phaser 133, the exhaust cam phaser 137, the valve solenoids 162, 164 and 166 and/or the transmission 118.

In some embodiments, the controller 170 may be a central controller for the system 100 (e.g., a vehicle or power gen system). In other embodiments, the controller 170 may include a controller of the vehicle system 102, which may be communicatively coupled to a central controller of the vehicle.

In some embodiments, the controller 170 may be configured to diagnose an engine braking performance, for example, a compression release engine braking performance, based on EMP corresponding to one or more of the cylinders 130, 132, 134, 136, 138 or 140 used for engine braking. For example, the controller 170 may be configured to determine an EMP value corresponding to at least one of the plurality of cylinders 130, 132, 134, 136, 138 or 140, which is being used for engine braking from an EMP sensor signal received from the EMP sensor 113. As previously described herein, the EMP sensor 113 is configured to measure, estimate, or otherwise determine an EMP pressure of the exhaust gas released during an exhaust stroke, or compressed air released during the compression stroke of one or more of the cylinders 130, 132, 134, 136, 138 or 140 due to opening of exhaust valve 148 when the one or more of the cylinders 130, 132, 134, 136, 138 or 140 is used for compression release braking.

The controller 170 is also configured to determine an engine braking value based on the EMP value. As previously described herein, the EMP value corresponds to an engine braking value (i.e., a compression release braking horsepower) and is used by the controller 170 to determine the engine braking value. For example, the controller 170 may include equations, algorithms and/or a lookup table stored in a memory thereof (e.g., memory 173) configured to correlate the EMP value to the engine braking value. The controller 170 is also configured to adjust the engine braking value based on the EMP value.

In some embodiments, in response to determining that the EMP value is less than a target EMP value (which may be a calibrated value, an operator-chosen value, an experimental value based on experimental testing of a similar system, or other preset value), the controller 170 determines that the engine braking value is less than a target engine braking value, i.e., the engine 108 is under-braking. For example, the target EMP value may correspond to the target engine braking value based on the algorithm, equation or lookup table stored in the controller 170, such that the EMP value being less than the target value corresponds to engine braking value being less than the target engine braking value. The target engine braking value may include an engine braking power value that provides a sufficient amount of engine braking without causing damage to parts of the engine 108 (e.g., the exhaust valves 148).

The controller 170 is configured to adjust at least one of the intake throttle 122, the intake cam phaser 133, or the exhaust cam phaser 137 associated with the engine 108, the exhaust valve 148 associated with the at least one cylinder 130, 132, 134, 136, 138 or 140, or the waste gate 126 to increase the engine braking value towards the target engine braking value. For example, the controller 170 may be configured to close the intake throttle 122 in response to the engine braking value being less than the target engine braking value, so as to cause vacuum braking in the corresponding cylinder 130, 132, 134, 136, 138 or 140 and increase the engine braking value towards the target engine braking value. Similarly, the controller 170 may additionally or alternatively adjust the intake cam phaser 133 and/or the exhaust cam phaser 137 to adjust timing of the intake valves 146 or exhaust valves 148, respectively to move the engine braking value towards the target engine braking value. For example, the controller 170 may delay the closing of the intake valve 146 of the corresponding cylinder 130, 132, 134, 136, 138 or 140 via the intake cam phaser 133 to allow a larger volume of air to be communicated into the corresponding cylinder 130, 132, 134, 136, 138 or 140. Additionally or alternatively, the controller 170 may delay opening of the exhaust valve 148 of the corresponding cylinder 130, 132, 134, 136, 138 or 140 during the exhaust stroke causing the trapped exhaust gas to exert a negative force on the piston of the corresponding cylinder 130, 132, 134, 136, 138 or 140, therefore increasing engine braking value towards the target engine braking value.

Additionally or alternatively, the controller 170 may adjust activation of the valve solenoid 162, 164, or 166 to adjust opening of the exhaust valve 148 of the corresponding cylinder 130, 132, 134, 136, 138 or 140 to adjust EMP and/or valve open duration of the corresponding exhaust valve 148. For example, the controller 170 may delay activation of the valve solenoid 162, 164 or 166 so as to increase pressure build up in the corresponding cylinder 130, 132, 134, 136, 138 or 140 and, therefore increase EMP value so as to increase engine braking value towards the target engine braking value. In some embodiments, the controller 170 may activate more than one of the valve solenoids 162, 164 or 166 so as to cause engine braking to be performed on two, four or all of the plurality of cylinders 130, 132, 134, 136, 138 or 140, therefore increasing engine braking. Additionally or alternatively, the controller 170 may adjust the waste gate 126 to adjust engine braking. For example, the controller 170 may be configured to adjust the waste gate 126 to direct more of the exhaust gas towards the aftertreatment system 158 relative to the turbocharger 119 so as to increase engine braking. Conversely, the controller 170 may be configured to adjust the waste gate 126 to direct more of the exhaust gas towards the turbocharger 119 relative to the aftertreatment system 158 to decrease engine braking, as previously described herein.

If the determined EMP value is equal to the target EMP value, the controller 170 determines that the engine braking value is equal to the target braking value. In some embodiments, the controller 170 may determine that the determined EMP value is greater than a target EMP value. In such embodiments, the controller 170 determines that the engine braking value is greater than a target engine braking value, i.e., the engine 108 is experiencing over-braking. The controller 170 is configured to adjust at least one of the intake throttle 122, the intake cam phaser 133, or the exhaust cam phaser 137 associated with the engine 108, the exhaust valve 148 associated with the at least one cylinders 130, 132, 134, 136, 138 or 140 being used for engine braking, or the waste gate 126 to increase the engine braking value towards the target engine braking value (e.g., a predefined value, an operator-chosen value, an experimental value based on experimental testing of a similar system, or other preset value).

In some embodiments, the measured EMP value may be unstable. In such embodiments, the controller 170 determines that the engine braking value is unstable, and generates a fault code, which may be stored in a memory of the controller 170 accessible to a user on demand. In some embodiments, the controller 170 may also be configured to broadcast the fault code via telematics (e.g., using the communications interface 198) to a central controller or cloud server. The controller 170 may also activate a malfunction indicator lamp (MIL) to inform the user about the engine braking being unstable. In some embodiments, the controller 170 may be configured to disable engine braking if the engine braking value is determined to be unstable.

In some embodiments, the controller 170 may be configured to set and maintain engine braking performance. For example, the controller 170 may be configured to set a target engine braking value (e.g., a predefined value, an operator-chosen value, an experimental value based on experimental testing of a similar system, or other preset value) based on a target EMP of compressed air emitted by at least one of the plurality of cylinders 130, 132, 134, 136, 138 or 140 that is being used for engine braking, a target vehicle speed (e.g., a predefined value, an operator-chosen value, an experimental value based on experimental testing of a similar system, or other preset value) of a vehicle including the engine 108, a target vehicle deceleration rate (e.g., a predefined value, an operator-chosen value, an experimental value based on experimental testing of a similar system, or other preset value) of the vehicle, or a target brake pedal position (e.g., a predefined position, or an experimental value based on experimental testing of a similar system, or other preset value) of a brake pedal associated with the vehicle. For example, a target value of each of these parameters corresponds to a target engine braking value. By determining the value of each of these parameters or a combination thereof (i.e., the target values) which yields a desired or target engine braking value, the controller 170 may use one or more of these parameters to set a target engine braking value (i.e., set an engine braking performance target).

Furthermore, the controller 170 is configured to adjust at least one of the intake throttle 122, the intake cam phaser 133, the exhaust cam phaser 137, the exhaust valve 148 associated with the at least one cylinder 130, 132, 134, 136, 138 or 140, or the waste gate 126 to maintain the engine braking performance at the target engine braking value, as previously described herein.

For example, in some embodiments, in response to at least one of the EMP being less than the target EMP, a vehicle speed being greater than the target vehicle speed, a vehicle deceleration rate being less than the target vehicle deceleration rate, or a brake pedal position of the brake pedal being greater than the target brake pedal position, the controller 170 is configured to determine that an engine braking value is less than the target engine braking value. As described before, the measured EMP value being less than the target EMP value correlates to the engine braking value being less than the target engine braking value. Similarly, the vehicle speed being greater than the target vehicle speed or the vehicle deceleration rate being less than the target vehicle deceleration rate implies that engine braking is less than the target, i.e., the engine 108 is under-braking. Furthermore, if the brake pedal position is greater than the target brake pedal position, i.e., the brake pedal is being depressed more than it should when the engine braking value is at the target engine braking value, this also implies that engine 108 is under-braking causing larger amount of conventional braking to be used. In such embodiments, the controller 170 is configured to adjust at least one of the intake throttle 122, the intake cam phaser 133, the exhaust cam phaser 137, the exhaust valve 148 associated with the at least one cylinder 130, 132, 134, 136, 138 or 140, or the waste gate 126 to increase the engine braking value towards the target engine braking value.

In some embodiments, the controller 170 is further configured to downshift or provide an instruction to an operator to downshift the transmission 118 associated with the vehicle to increase the engine braking value towards the target engine braking value. Downshifting shifts the transmission 118 to a lower gear that exerts a higher torque on the engine 108, thereby increasing engine braking.

If the determined EMP value is equal to the target EMP value, the vehicle speed is equal to the target vehicle speed, the deceleration rate is equal to the target deceleration rate and/or the brake pedal position is less than or equal to the target brake pedal position, the controller 170 determines that the engine braking value is at the target engine braking value. In some embodiments, in response to at least one of the EMP being greater than the target EMP, the vehicle speed being less than the target vehicle speed, or the vehicle deceleration rate being greater than the target vehicle deceleration rate, the controller 170 is configured to determine that the engine braking value is greater than the target engine braking value, i.e., the engine 108 is over-braking. The controller 170 adjusts at least one of the intake throttle 122, the intake cam phaser 133, the exhaust cam phaser 137, the exhaust valve 148 associated with the at least one cylinder of the plurality of cylinders 130, 132, 134, 136, 138 or 140, or the waste gate 126 to decrease the engine braking value towards the target engine braking value. In some embodiments, the controller 170 is further configured to upshift the transmission 118 associated with the vehicle so as to decrease torque exerted on the engine 108 by the transmission 118 and decrease the engine braking value towards the target engine braking value.

In various embodiments, the controller 170 may comprise an electronic control unit configured to receive various signals, for example, an EMP signal from the EMP sensor 113 to diagnose, set and/or adjust engine braking performance of the engine 108 of the vehicle system 102. Furthermore, the controller 170 may also be configured to receive a brake pedal position signal from the brake pedal position sensor 111, a vehicle speed signal, and a deceleration rate signal from vehicle speed sensor 169, and a transmission signal from the transmission 118 to set and maintain the engine braking value at the target engine braking value.

Figure 2:
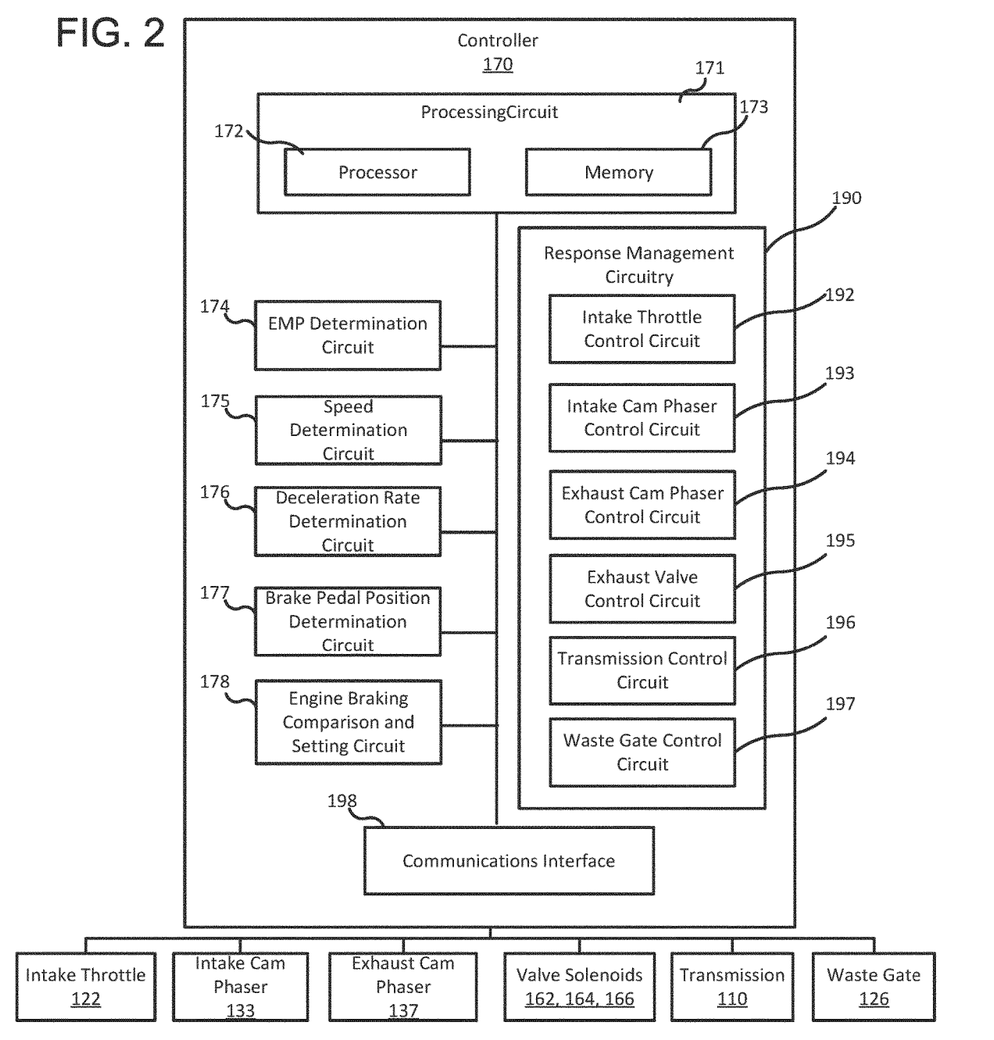
FIG. 2 is a schematic block diagram of the controller of FIG. 1, according to an embodiment.

As shown in FIG. 2, the controller 170 includes a processing circuit 171 having a processor 172 and a memory 173, an EMP determination circuit 174, a speed determination circuit 175, a deceleration rate determination circuit 176, a brake pedal position determination circuit 177 and/or an engine braking comparison and setting circuit 178. The controller 170 may also include a response management circuitry 190 including an intake throttle control circuit 192, an intake cam phaser control circuit 193, an exhaust cam phaser control circuit 194, an exhaust valve control circuit 195, a transmission control circuit 196 and a waste gate control circuit 197. Furthermore, the controller 170 may include a communications interface 198.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables, algorithms, or instructions.

In one configuration, the EMP determination circuit 174, the speed determination circuit 175, the deceleration rate determination circuit 176, the brake pedal position determination circuit 177, the engine braking comparison and setting circuit 178, and the response management circuitry 190 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the EMP determination circuit 174, the speed determination circuit 175, the deceleration rate determination circuit 176, the brake pedal position determination circuit 177, the engine braking comparison and setting circuit 178, and the response management circuitry 190 are embodied as hardware units, such as electronic control units. As such, the EMP determination circuit 174, the speed determination circuit 175, the deceleration rate determination circuit 176, the brake pedal position determination circuit 177, the engine braking comparison and setting circuit 178, and the response management circuitry 190 may be embodied as one or more circuitry components including, but not limited to, processing circuitry, network interfaces, peripheral devices, input devices, output devices, sensors, etc. In some embodiments, the EMP determination circuit 174, the speed determination circuit 175, the deceleration rate determination circuit 176, the brake pedal position determination circuit 177, the engine braking comparison and setting circuit 178, and the response management circuitry 190 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the EMP determination circuit 174, the speed determination circuit 175, the deceleration rate determination circuit 176, the brake pedal position determination circuit 177, the engine braking comparison and setting circuit 178, and the response management circuitry 190 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the EMP determination circuit 174, the speed determination circuit 175, the deceleration rate determination circuit 176, the brake pedal position determination circuit 177, the engine braking comparison and setting circuit 178, and the response management circuitry 190 may also include programmable hardware devices such as field programmable gate arrays, programmable array logic, programmable logic devices or the like. In this regard, the EMP determination circuit 174, the speed determination circuit 175, the deceleration rate determination circuit 176, the brake pedal position determination circuit 177, the engine braking comparison and setting circuit 178, and the response management circuitry 190 may include one or more memory devices for storing instructions that are executable by the processor(s) the EMP determination circuit 174, the speed determination circuit 175, the deceleration rate determination circuit 176, the brake pedal position determination circuit 177, the engine braking comparison and setting circuit 178, and the response management circuitry 190. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect to the EMP determination circuit 174, the speed determination circuit 175, the deceleration rate determination circuit 176, the brake pedal position determination circuit 177, the engine braking comparison and setting circuit 178, and the response management circuitry 190. Thus, the depicted configuration represents the aforementioned arrangement where the EMP determination circuit 174, the speed determination circuit 175, the deceleration rate determination circuit 176, the brake pedal position determination circuit 177, the engine braking comparison and setting circuit 178, and the response management circuitry 190 are embodied as machine or computer-readable media that may be stored in non-volatile memory (e.g., memory 173) and executable by a processor or a group of processing components, such as processor 172. However, as mentioned above, this illustration is not meant to be limiting as the present disclosure contemplates other embodiments such as the aforementioned embodiment where the EMP determination circuit 174, the speed determination circuit 175, the deceleration rate determination circuit 176, the brake pedal position determination circuit 177, the engine braking comparison and setting circuit 178, and the response management circuitry 190 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the EMP determination circuit 174, the speed determination circuit 175, the deceleration rate determination circuit 176, the brake pedal position determination circuit 177, the engine braking comparison and setting circuit 178, and the response management circuitry 190 may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 198 may include wireless interfaces (e.g., jacks, antennas, transmitters, receivers, transceivers, wire terminals, etc.) for conducting data communications with various systems, devices, or networks. For example, the communications interface 198 may include an communication circuits for communication with each the various sensors included in the system 100 and the vehicle subsystems 104 via, for example, a CAN bus.

The EMP determination circuit 174 is configured to receive an EMP signal from the EMP sensor 113 and determine an EMP value of the exhaust gas or compressed gas flowing through the exhaust manifold 112 therefrom. The EMP of the compressed gas released from one or more cylinders of the plurality of cylinders 130, 132, 134, 136, 138 or 14, during the compression stroke corresponds to the engine braking value, as previously described herein. The EMP determination circuit 174 is also configured to determine an engine braking value based on the measured EMP value, for example, using equations, algorithms or a look up table.

The speed determination circuit 175 is configured to receive a speed signal from the vehicle speed sensor 169 and determine the vehicle speed therefrom. The deceleration rate determination circuit 176 is configured to receive a deceleration signal received from the vehicle speed sensor 169 and determine a deceleration rate of the vehicle therefrom. In other embodiments, the deceleration rate determination circuit 176 may be configured to receive a plurality of speed signals from the vehicle speed sensor 169 at different time points as the vehicle is decelerating and determine the deceleration rate of the vehicle therefrom.

The brake pedal position determination circuit 177 is configured to receive a brake pedal position signal from the brake pedal position sensor 111 and determine a brake pedal position of the brake pedal associated with the vehicle therefrom. The brake pedal position corresponds to an amount of conventional braking being applied on the vehicle.

The engine braking comparison and setting circuit 178 is configured to compare the measured EMP value with the target EMP value to determine whether the engine 108 is under-braking, is over-braking, or is unstable. The engine braking comparison and setting circuit 178 may also be configured to set a target engine braking value for engine braking based on the target EMP of exhaust gas emitted by at least one cylinder of the plurality of cylinders 130, 132, 134, 136, 138 or 140 that is being used for engine braking, the target vehicle speed of the vehicle, the target vehicle deceleration rate of the vehicle, or a target brake pedal position of the brake pedal, as previously described herein. In such embodiments, the engine braking comparison and setting circuit 178 is also configured to compare the measured EMP value to the target EMP value, the measured vehicle speed to the target vehicle speed, the measured deceleration rate to the target deceleration rate, and the determined brake pedal position to the target brake pedal position to determine whether the engine 108 is under-braking or over-braking.

The response management circuitry 190 is configured to adjust a determined engine braking value towards a target engine braking value based on the measured EMP value, the measured vehicle speed, the measured deceleration rate, and/or the determined brake pedal position. In this regard, the intake throttle control circuit 192 is configured to adjust the intake throttle 122 in response to the measured EMP value, the measured vehicle speed and/or the vehicle deceleration rate being different than their respective values, or the brake pedal position being greater than the target braking pedal position value as determined by the engine braking comparison and setting circuit 178, so as to increase or decrease vacuum braking to adjust the engine braking value towards the target engine braking value.

The intake cam phaser control circuit 193 and the exhaust cam phaser control circuit 194 are configured to adjust the intake cam phaser 133 and the exhaust cam phaser 137, respectively in response to the engine braking value being different from the target engine braking value based on the measured EMP value, the measured vehicle speed and deceleration rate, and/or determined brake pedal position, as previously described herein. This adjusts the timing of the intake valve 146 and/or the exhaust valve 148 of at least one of the cylinders of the plurality of cylinders 130, 132, 134, 136, 138 or 140 (e.g., one or more of the cylinders 130, 132, 134, 136, 138 or 140 used for compressive release braking) to adjust engine braking.

The exhaust valve control circuit 195 is configured to adjust an activation time or activation duration of one or more the valve solenoids 162, 164 or 166, as previously described herein in response to the engine braking value being different from the target engine braking value based on the measured EMP value, the measured vehicle speed and deceleration rate, and/or determined brake pedal position, as previously described herein. In this manner, an opening time or duration of opening of the exhaust valve 148 of one or more of the cylinders 130, 132, 134, 136, 138 or 140 may be adjusted so as to increase or decrease compression release braking to adjust the engine braking value towards the target engine braking value.

The transmission control circuit 196 is configured to adjust the transmission 118 in response to engine braking value being different from the target engine braking value based on the measured EMP value, the measured vehicle speed and deceleration rate, and/or determined brake pedal position. For example, the transmission control circuit 196 may downshift the transmission 118 to increase engine braking or upshift the transmission 118 to decrease engine braking.

The waste gate control circuit 196 is configured to adjust the waste gate 126 in response to the engine braking value being different from the target engine braking value based on the measured EMP value, the measured vehicle speed and deceleration rate and/or determined brake pedal position. For example, the waste gate control circuit 196 may adjust the waste gate 126 to direct more of the exhaust gas to bypass the turbocharger 119 and flow towards the aftertreatment system 158 than the turbocharger 119 to increase engine braking, or adjust the waste gate 126 to direct more of the exhaust gas to the turbocharger 119 relative to the aftertreatment system 158 to reduce engine braking.

Figure 3:
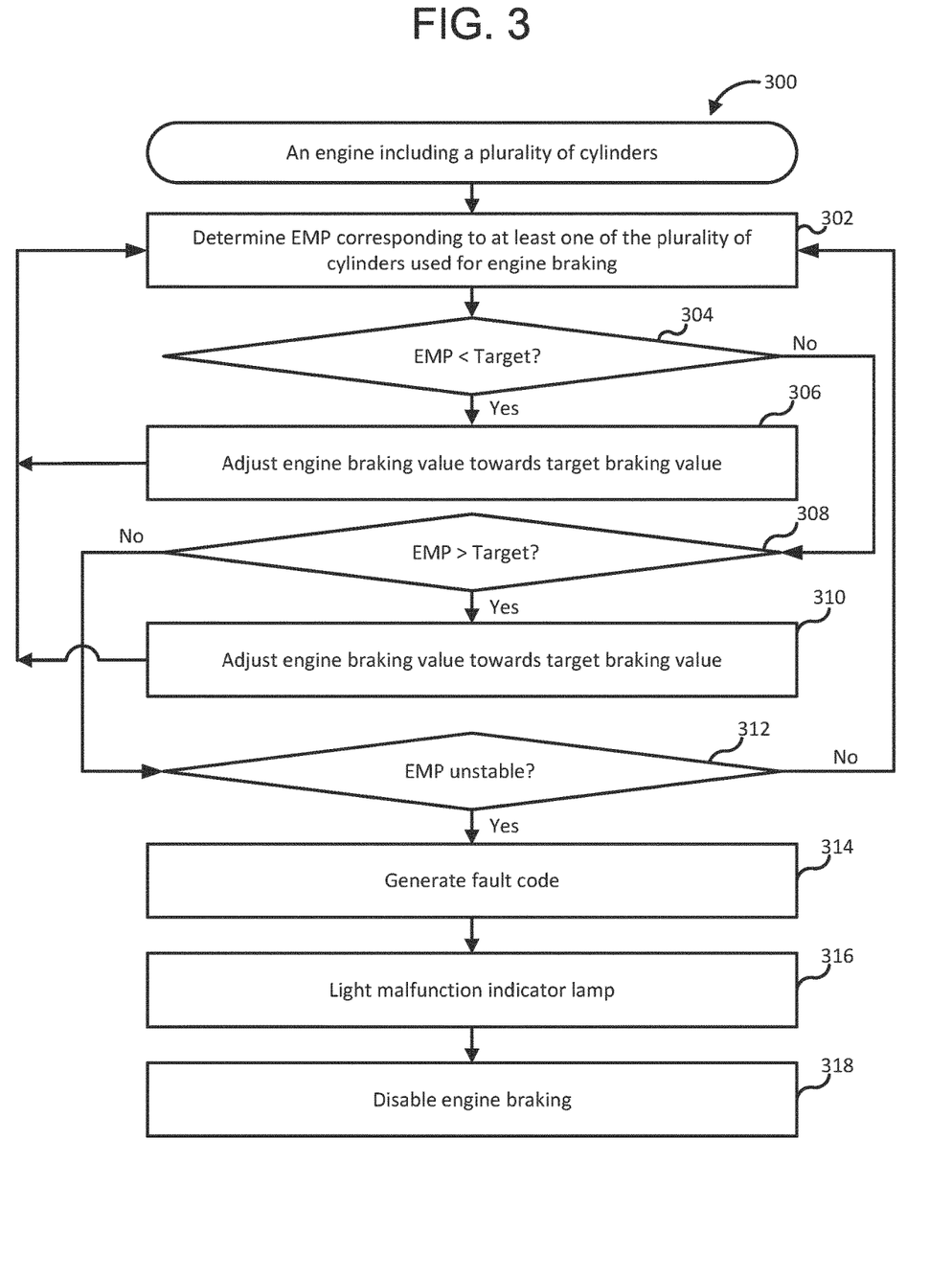
FIG. 3 is a schematic flow diagram of a method for diagnosing compression release braking in a SI engine, according to an embodiment.

FIG. 3 is a schematic flow diagram of a method 300 for diagnosing engine braking performance of an engine (e.g., the engine 108) including a plurality of cylinders (e.g., the cylinders 130, 132, 134, 136, 138 or 140) based on an EMP value, and adjusting the engine braking performance. The operations of the method 300 may be performed by the controller 170 or any other controller included in a vehicle (e.g., an ECM of a vehicle) that includes an SI engine configured to perform compression release braking.

The method 300 includes determining an EMP value corresponding to at least one cylinder of the plurality of cylinders that is being used for engine braking, at 302. For example, the EMP determination circuit 174 may interpret an EMP signal from the EMP sensor 113 and determine the EMP value therefrom.

At 304, the EMP value is compared to a target EMP value. The determined EMP value corresponds to a target engine braking value such that the EMP value being less than the target EMP value indicates that the engine braking value is less than a target engine braking value. If the EMP value is less than the target EMP value (304:YES), the engine braking value is adjusted towards a target engine braking value, at 306. For example, the controller 170 may adjust at least one of the intake throttle 122, the intake cam phaser 133, the exhaust cam phaser 137 associated with the engine 108, the exhaust valve 148 associated with at least one cylinder of the plurality of cylinders 130, 132, 134, 136, 138 or 140, or the waste gate 126 to increase the engine braking value towards the target engine braking value.

If the determined EMP value is not less than the target EMP value (304:NO), the method 300 moves to operation 308, and a determination is made regarding whether the determined EMP value is greater than the target EMP value. If the determined EMP value is greater than the target EMP value (308:YES), the engine braking value is adjusted towards the target engine braking value, at 310. For example, the controller 170 may adjust the intake throttle 122, the intake cam phaser 133, the exhaust cam phaser 137, or the exhaust valve 148 of at least one of the cylinders 130,

132, 136, 138 or 140 to decrease the engine braking value towards the target engine braking value.

If the determined EMP value is not greater than the target EMP value (308:NO), a determination is made regarding whether the EMP is unstable, at 312. If the EMP is stable (312: NO), the method 300 returns to operation 302. In response to the EMP value being unstable (312:YES), a fault code is generated, at 314. For example, if the controller 170 (e.g., the engine braking comparison and setting circuit 178), determines that the determined EMP value is unstable, the controller 170 generates a fault code indicating that the engine braking is unstable. The fault code may be stored in a memory (e.g., the memory 173) of the controller 170. In some embodiments, a MIL is activated (e.g., turned ON), at 316 to indicate to a user that the engine braking is unstable. In some embodiments, the engine braking is disabled (e.g., by the controller 170), at 318 in response to determining that the engine braking is unstable.

Figure 4A:
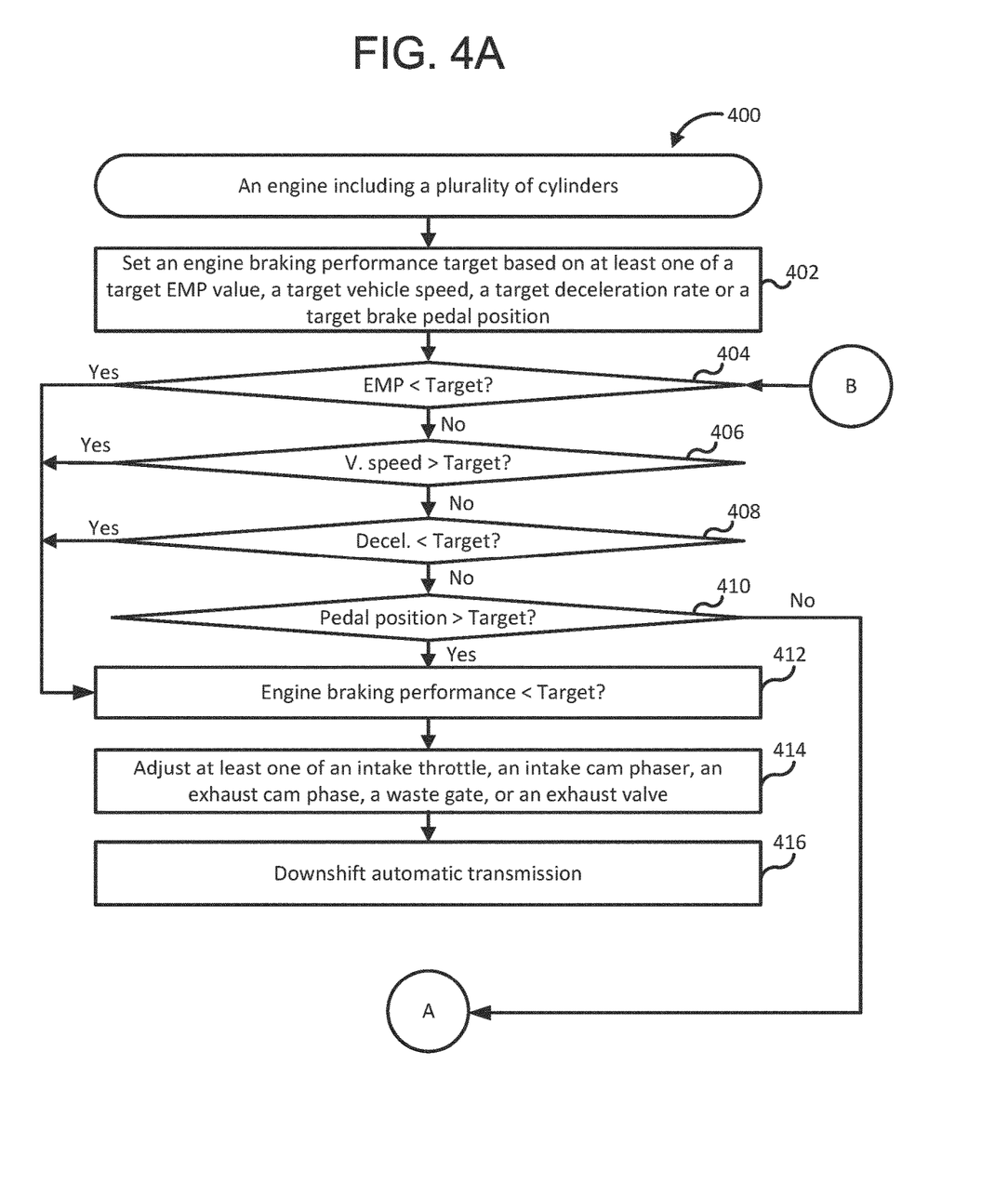
FIGS. 4A-4B are schematic flow diagrams of a method for setting and maintaining compression release braking in an engine, according to an embodiment.
Figure 4B:
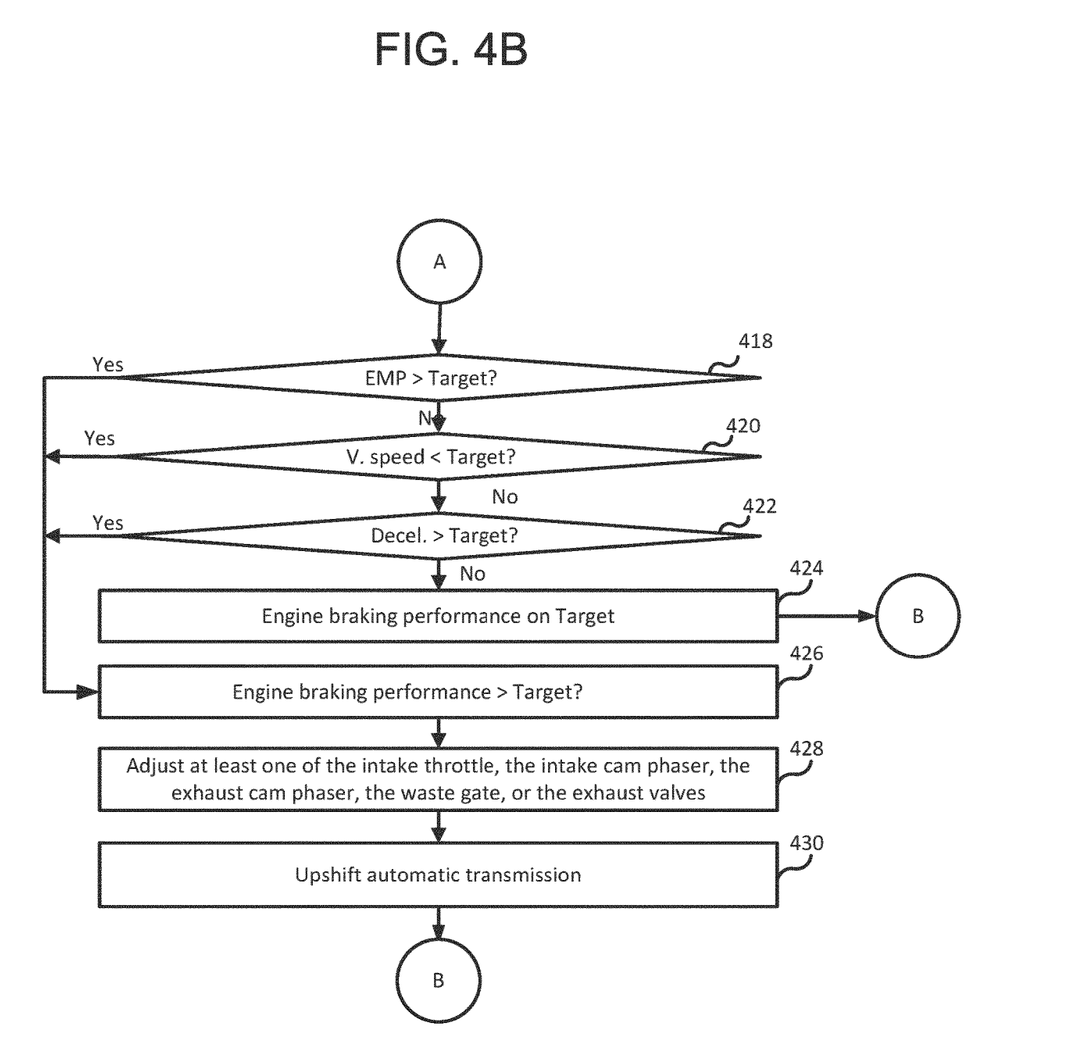

FIGS. 4A and 4B are schematic flow diagrams of another method 400 for setting engine braking value at a target engine braking value and maintaining the engine braking value at a target engine braking value, according to an embodiment. The operations of the method 400 may be performed by the controller 170 or any other controller included in a vehicle (e.g., an ECM of a vehicle) that includes an SI engine configured to perform compression release braking.

The method 400 includes setting a target engine braking value for engine braking based on at least one of a target exhaust manifold pressure of exhaust gas emitted by at least one cylinder of a plurality of cylinders (e.g., the cylinders 130, 132, 134, 136, 138 or 140) that is being used for engine braking, a target vehicle speed of a vehicle (e.g., the vehicle including the engine 108), a target vehicle deceleration rate of the vehicle, or a target brake pedal position of a brake pedal associated with the vehicle, at 402. For example, the controller 170 may set the engine braking value at the target engine braking value based on the target EMP value, the target vehicle speed, the target vehicle deceleration rate, and/or the target brake pedal position.

At 404, it is determined if a determined EMP value is less than a target EMP value. If the determined EMP value is less than the target EMP value (404:YES), a determination is made regarding whether the engine braking value is less than target engine braking value (i.e., the engine is under-braking), at 412 (e.g., by the controller 170). At 414, at least one of an intake throttle (e.g., the intake throttle 122), an intake cam phaser (e.g., the intake cam phaser 133), an exhaust cam phaser (e.g., the exhaust cam phaser 137), an exhaust valve (e.g., the exhaust valve 148 of one or more of the cylinders 130, 132, 134, 136, 138 or 140 via the valve solenoids 162, 164 or 166), or a waste gate (e.g., the waste gate 126) associated with a turbocharger (e.g., the turbocharger 119) coupled to the engine to increase the engine braking value towards the target engine braking value.

If the EMP value is not less than the target EMP value (404:NO), a determination regarding whether the vehicle speed is greater than the target vehicle speed (e.g., by the controller 170 based on the EMP signal from the EMP sensor 113), at 406. If the vehicle speed is greater that the target vehicle speed (406:YES), a determination is made regarding whether the engine braking value is less than the target engine braking value, at 412, and the engine braking value is moved towards the target braking value, at 414, as previously described herein.

If the vehicle speed is not greater than the target vehicle speed (406: NO), a determination is regarding whether the vehicle deceleration rate is less than the target vehicle deceleration rate (e.g., via the controller 170 based on a vehicle speed signal or vehicle deceleration rate signal from the vehicle speed sensor 169), at 408. If the vehicle deceleration rate is less than the target deceleration rate (408: YES), a determination is also made regarding whether the engine braking value is less than the target engine braking value, at 412, and the engine braking value is moved towards the target braking value, at 414, as previously described herein.

If the vehicle deceleration is also not less than the target deceleration rate (408:NO), a determination is made regarding whether the brake pedal position is greater than a target brake pedal position (e.g., by the controller 170 based on the brake pedal position signal from the brake pedal position sensor 111), at 410. If the brake pedal position is greater than the target brake pedal position (410:YES), a determination is made regarding whether the engine braking value is less than the target engine braking value, at 412, and the engine braking value is moved towards the target braking value, at 414, as previously described herein.

In some embodiments, the method 400 also includes downshifting a transmission associated with the vehicle to increase the engine braking value towards the target engine braking value, at 416. For example, the controller 170 may downshift the transmission 118 so as to increase the torque on the engine and, therefore increase engine braking.

If the brake pedal position is also not greater than the target brake pedal position (410:NO), the method 400 moves to operation 418 and a determination is made regarding whether the determined EMP value is greater than the target EMP value. If the EMP value is greater than the target EMP value (418:YES), a determination is made regarding whether the engine braking value is greater than the target engine braking value (i.e., the engine is over-braking), at 426. At 428, the at least one of the intake throttle (e.g., the intake throttle 122), the intake cam phaser (e.g., the intake cam phaser 133), the exhaust cam phaser (e.g., the exhaust cam phaser 137), the exhaust valve (e.g., the exhaust valve 148 via the valve solenoids 162, 164 or 166) associated with the at least one cylinder of the plurality of cylinders (e.g., one or more of the plurality of cylinders 130, 132, 134, 136, 138 or 140), or the waste gate (e.g., the waste gate 126) to decrease the engine braking value towards the target engine braking value.

If the determined EMP value is not greater than the target EMP value (418:NO), a determination is made regarding whether the vehicle speed is less than the target vehicle speed, at 420. In response to the vehicle speed being less than the target vehicle speed (420:YES), a determination is made regarding whether the engine braking value is greater than the target engine braking value, at 426, and the engine braking value is decreased towards the target braking value, at 428 as previously described herein.

If the determined vehicle speed is not less than the target vehicle speed (420:NO), a determination is made regarding whether the vehicle deceleration rate is greater than the target deceleration speed, at 422. In response to the vehicle deceleration rate being greater than the target vehicle deceleration rate, a determination is made regarding whether the engine braking value is greater than the target engine braking value, at 426, and the engine braking value is decreased towards the target braking value, at 428 as previously described herein.

In some embodiments, the method 400 also includes upshifting a transmission associated with the vehicle to decrease the engine braking value towards the target engine braking value, at 430. For example, the controller 170 may upshift the transmission 118 so as to reduce the torque on the engine and, therefore decreasing engine braking.

If the vehicle deceleration rate is also not greater than the target vehicle deceleration rate (422:NO), it is determined that the engine braking performance is on target, at 424 and the method returns to operation 404.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for diagnosing and controlling engine braking performance of an engine comprising a plurality of cylinders, the system comprising:
    an exhaust manifold pressure sensor configured to detect an exhaust manifold pressure corresponding to exhaust gas emitted from the plurality of cylinders; and
    a controller configured to:
        determine an exhaust manifold pressure value corresponding to at least one cylinder of the plurality of cylinders that is being used for engine braking from an exhaust manifold pressure sensor signal received from the exhaust manifold pressure sensor;
        determine an engine braking value based on the exhaust manifold pressure value; and
        adjust the engine braking value towards a target engine braking value.

2. The system of claim 1, wherein the controller is further configured to:
    in response to determining that the exhaust manifold pressure value is less than a target exhaust manifold pressure value, determine that the engine braking value is less than the target engine braking value; and
    adjust at least one of an intake throttle, an intake cam phaser or an exhaust cam phaser associated with the engine, an exhaust valve associated with the at least one cylinder, or a waste gate associated with a turbocharger coupled to the engine to increase the engine braking value towards the target engine braking value.

3. The system of claim 2, wherein the controller is further configured to:
    in response to determining that the exhaust manifold pressure value is greater than the target exhaust manifold pressure value, determine that the engine braking value is greater than the target engine braking value; and
    adjust at least one of the intake throttle, the intake cam phaser or the exhaust cam phaser associated with the engine, or the exhaust valve associated with the at least one cylinder to decrease the engine braking value towards the target engine braking value.

4. The system of claim 1, wherein the controller is configured to:
    in response to determining that the exhaust manifold pressure value is unstable, determine that the engine braking value is unstable; and
    generate a fault code.

5. The system of claim 4, wherein the controller is further configured to disable engine braking in response to the engine braking value being unstable.

6. A system, comprising:
    a controller configured to:
        determine an exhaust manifold pressure value corresponding to at least one cylinder of a plurality of cylinders that is being used for engine braking based on a signal received from an exhaust manifold pressure sensor;
        set a target engine braking value for engine braking based on a target exhaust manifold pressure of exhaust gas emitted by at least one cylinder of the plurality of cylinders that is being used for engine braking; and
        adjust a component associated with the engine so as to maintain an engine braking value at the target engine braking value based on the determined exhaust manifold pressure value.

7. The system of claim 6, wherein the controller is configured to set the target engine braking value based also on at least one of a target vehicle speed of a vehicle, a target vehicle deceleration rate of the vehicle, or a target brake pedal position of a brake pedal associated with the vehicle.

8. The system of claim 7, wherein the component associated with the engine comprises at least one of an intake throttle, an intake cam phaser or an exhaust cam phaser associated with the engine of the vehicle, an exhaust valve associated with the at least one cylinder of the plurality of cylinders, or a waste gate associated with a turbocharger coupled to the engine.

9. The system of claim 8, wherein the controller is further configured to:
- in response to at least one of an exhaust manifold pressure being less than the target exhaust manifold pressure, a vehicle speed being greater than the target vehicle speed, a vehicle deceleration rate being less than the target vehicle deceleration rate, or a brake pedal position of the brake pedal being greater than the target brake pedal position, determine that the engine braking value is less than the target engine braking value; and
- adjust at least one of the intake throttle, the intake cam phaser, the exhaust cam phaser, the waste gate, or the exhaust valve associated with the at least one cylinder to increase the engine braking value towards the target engine braking value.

10. The system of claim 9, wherein the controller is further configured to downshift an automatic transmission associated with the vehicle to increase the engine braking value towards the target engine braking value.

11. The system of claim 9, wherein the controller is configured to:
- in response to at least one of the exhaust manifold pressure being greater than the target exhaust manifold pressure, the vehicle speed being less than the target vehicle speed, or the vehicle deceleration rate being greater than the target vehicle deceleration rate, determine that the engine braking value is greater than the target engine braking value; and
- adjust at least one of the intake throttle, the intake cam phaser, the exhaust cam phaser, the waste gate, or the exhaust valve associated with the at least one cylinder to decrease the engine braking value towards the target engine braking value.

12. The system of claim 11, wherein the controller is further configured to upshift an automatic transmission associated with the vehicle to decrease the engine braking value towards the target engine braking value.

13. A method for controlling engine braking in an engine including a plurality of cylinders, comprising:
- determining an exhaust manifold pressure value corresponding to at least one cylinder of the plurality of cylinders that is being used for engine braking;
- determining an engine braking value based on the exhaust manifold pressure value; and
- adjusting the engine braking value towards a target engine braking value.

14. The method of claim 13, further comprising:
- in response to determining that the exhaust manifold pressure value is less than a target exhaust manifold pressure value, determining that the engine braking value is less than the target engine braking value; and
- adjusting at least one of an intake throttle, an intake cam phaser or an exhaust cam phaser associated with the engine, an exhaust valve associated with the at least one cylinder, or a waste gate associated with a turbocharger couple to the engine to increase the engine braking value toward the target engine braking value.

15. The method of claim 14, further comprising:
- in response to determining that the exhaust manifold pressure value is greater than the target exhaust manifold pressure value, determining that the engine braking value is greater than the target engine braking value; and
- adjusting at least one of the intake throttle, the intake cam phaser or the exhaust cam phaser associated with the engine, or the exhaust valve associated with the at least one cylinder to decrease the engine braking value towards the target engine braking value.

16. The method of claim 13, further comprising:
- in response to determining that the exhaust manifold pressure value is unstable, determining that the engine braking value is unstable; and
- generating a fault code.

17. The method of claim 16, further comprising:
- activating a malfunction indicator regarding the engine braking value being unstable.

18. The method of claim 16, further comprising:
- disabling engine braking in response to the engine braking value being unstable.

* * * * *